US008517364B1

(12) United States Patent
Crumley et al.

(10) Patent No.: US 8,517,364 B1
(45) Date of Patent: Aug. 27, 2013

(54) DISK HOLDER WITH REPLACEABLE INSERTS TO RETAIN SPRINGS

(75) Inventors: Gary Crumley, Walnut Creek, CA (US);
Hung Hee Yeoh, Bayan Lepas (MY); Yi Chun Tan, Gelugor (MY)

(73) Assignee: WD Media, LLC, San Jose, CA (US)

( * ) Notice: Subject to any disclaimer, the term of this patent is extended or adjusted under 35 U.S.C. 154(b) by 413 days.

(21) Appl. No.: 12/899,737

(22) Filed: Oct. 7, 2010

(51) Int. Cl.
*B25B 5/16* (2006.01)

(52) U.S. Cl.
USPC ......... 269/95; 269/903; 118/300; 204/298.15

(58) Field of Classification Search
CPC ........................................................ B25B 5/16
USPC .............. 269/95, 903, 900, 21, 20; 118/300, 118/728; 204/298.15, 298.11
See application file for complete search history.

(56) References Cited

U.S. PATENT DOCUMENTS

| | | | | |
|---|---|---|---|---|
| 5,543,022 A | * | 8/1996 | Nguyen et al. | 204/298.15 |
| 5,938,902 A | * | 8/1999 | Nguyen et al. | 204/298.15 |
| 5,976,255 A | * | 11/1999 | Takaki et al. | 118/500 |
| 6,030,455 A | * | 2/2000 | Nozawa et al. | 118/500 |
| 6,162,336 A | | 12/2000 | Lee et al. | |
| 6,202,592 B1 | * | 3/2001 | Nozawa et al. | 118/723 R |
| 6,228,429 B1 | * | 5/2001 | Bluck et al. | 427/331 |
| 6,689,264 B1 | | 2/2004 | Belisle et al. | |
| 6,774,376 B2 | | 8/2004 | Cordts, III | |
| 7,927,473 B2 | * | 4/2011 | Houman et al. | 204/298.15 |

* cited by examiner

*Primary Examiner* — Lee D Wilson

(57) ABSTRACT

Embodiments of the present invention include a substrate holder apparatus comprising a plate configured with an opening designed to receive a substrate; and a plurality of gripper assemblies disposed around the opening and configured to hold the substrate at a predetermined position within the opening such that the substrate is substantially coplanar with respect to a surface of the plate, at least one of the gripper assemblies comprising: a support element configured to grip an outside edge of the substrate, the support element mounted to a mount assembly configured to be attached to the substrate holder apparatus such that the support element holds the substrate at the predetermined position with respect to the plate.

24 Claims, 10 Drawing Sheets

DISK HOLDER WITH REPLACEABLE INSERTS TO RETAIN SPRINGS

TECHNICAL FIELD

This invention relates to the field of manufacturing disk drives and more specifically, to apparatuses for manufacturing disk substrates.

BACKGROUND

At present, automated sputtering machines are utilized to manufacture substrates for numerous devices, from integrated circuits to disk storage devices. With respect to substrates for disk storage devices, some sputtering machines are configured to produce disk substrates at rates of 1300 parts-per hour (PPH) or higher. In order to do so, some such sputtering machines (e.g., Canon® Anelva® C3040 & C3050 machines) use a disk substrate holder (sometimes referred to as an "insert holder") to transfer a disk substrate from chamber to chamber within the sputtering machine.

FIG. 1 illustrates example conventional disk substrate holders 103 installed in an example loading chamber mechanism 106. As illustrated, the disk substrate holders 103 receives a disk 104 from the direction shown in the Figure, typically from what is called a pick and place system. Once received, the holders typically hold their respective disk payload (e.g., disk 104) using spring-like plates (i.e., resilient elements) known as grippers. Conventional disk substrate holders comprise removable gripper assemblies (also referred to as "insert blocks") that provide the grippers. One of the objectives of a disk substrate holder is to make sure the grippers have a fixed distance relative to the center of holder such that even after many cleaning cycles chances of disk droppage remains low. More with respect to the fixed distances and cleaning processes will be described later below.

In FIG. 1, each of the illustrated holders 103 comprise top grippers 105 designed to be substantially static and rigid, and a bottom gripper 107 having an amount of flexibility sufficient to allow for acceptance and release of a disk payload. In order to facilitate control of the bottom gripper 107, mechanism 106 is configured with a motor 109, a sensor plate 110, and pins 111 that, when used in concert, enable simultaneous control of the bottom gripper 107 of the holders 103. In order to facilitate the movement of the disk substrate holders 103 and their disk payload (e.g., disk 104) from chamber to chamber, the loading chamber mechanism 106 is also configured with a magnetic shaft 112, and a carrier base 115 into which the substrate holders 103 are inserted.

FIG. 2 provides a detailed illustration of an example conventional disk substrate holder 203 configured for 65 mm disk substrates. View 227 provides a perspective view of the same holder 203. The holder 203, as illustrated, comprises top gripper assemblies 209, and a bottom gripper assembly 221. Though all of the illustrated gripper assemblies are attached to the holder 203 by way of two cap screws 215 and a nut plate 212, the top gripper assemblies comprise top grippers 206 that are shorter in length and, therefore, less flexible than the bottom gripper 218 of the bottom gripper assembly 221. For the illustrated holder 203, the top grippers function have sufficient resilience to retain and hold a disk substrate (e.g., disk 104), but not enough flexibility to accept or release a disk substrate. That role is given to the bottom gripper 218, which has sufficient flexibility (due in part to its length and it composition) to be forcibly bent from its static, un-sprung position as shown in FIG. 2, to its displaced position (not shown). When displaced from it static position, the bottom gripper 218 allows the holder 203 to freely receive or release a disk substrate. In order to allow this displacement to take place, the holder 203 is additionally configured with an opening 224 having sufficient clearance to enable the displacement.

Typically, after a few days of use (e.g., 5 days) within the sputtering machine, a conventional holder (e.g., holders 103, 203) is considered to be a dirty (i.e., a "dirty holder") from the accumulation of sputtered material, which must be replaced with a clean holder to continue proper manufacturing of disk substrates. In order to reuse the dirty holders, the gripper assemblies are usually removed from the dirty holder, and the dirty holder is then subjected to a cleaning, usually by chemical edging or sandblasting.

Unfortunately, use of the cleaning process limits usefulness of a conventional disk substrate holder to a low number of clean and use cycles (e.g., 3). This is because conventional holders comprise of critical dimensions that allow its grippers to receive and consistently hold a disk substrate of specific dimensions (e.g., 65 mm or 95 mm). When these critical dimensions are altered by multiple iterations clean and use cycles, the orientation and hold consistency of the grippers are effected, resulting in increased occurrences of disk drops by disk substrate holders. Accordingly, after a number of cycles, a dirty holder is no longer useful even after cleaning.

FIG. 3 illustrates an example conventional disk substrate holder 303 without gripper assemblies installed and before being subjected to a cleaning process. FIG. 3 also illustrates and highlights the critical dimensions 306, 309, and 312, which, if altered by a cleaning process, would have an adverse affect on distances X1 and X2 and, therefore, the distances and orientation of the grippers as well (once they are installed after the holder is cleaned).

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth to provide a thorough understanding of various embodiments of the present invention. It will be apparent however, to one skilled in the art that these specific details need not be employed to practice various embodiments of the present invention. In some instances, well known components or methods have not been described in detail to avoid unnecessarily obscuring various embodiments of the present invention.

Embodiments of the present invention include a substrate holder apparatus comprising a plate configured with an opening designed to receive a substrate; and a plurality of gripper assemblies disposed around the opening and configured to hold the substrate at a predetermined position within the opening. In some embodiments, the gripper assemblies are configured to hold the substrate in a substantially coplanar orientation with respect to a surface of the plate. In further embodiments, at least one of the gripper assemblies comprises a support element (e.g., a gripper) configured to grip an outside edge of the substrate, wherein the support element is mounted to a mount assembly configured to be attached to the substrate holder apparatus. In some such embodiments, the support element holds the substrate at the predetermined position with respect to the plate.

Figure 1:
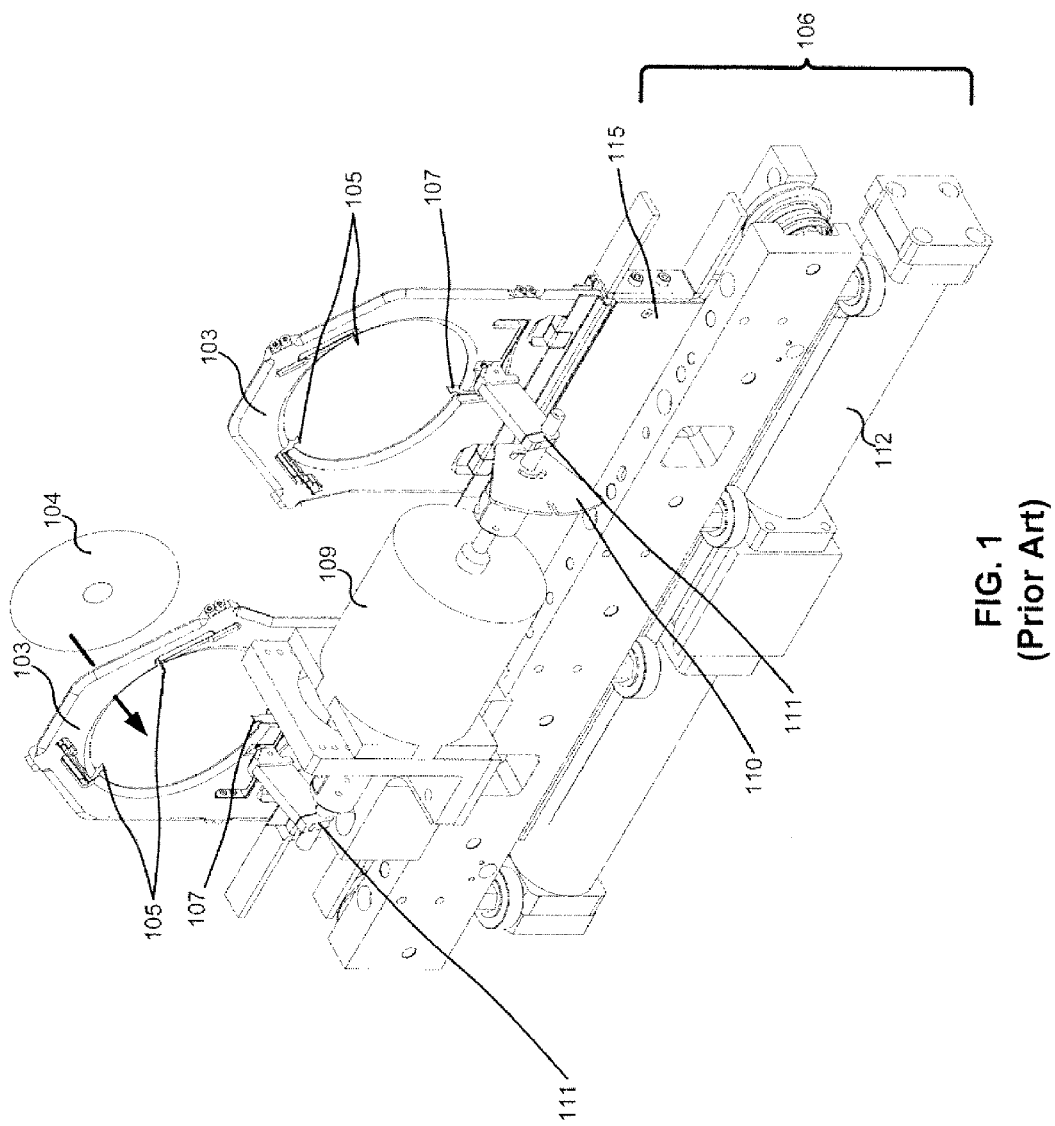
FIG. 1 (prior art) illustrates example conventional disk substrate holders installed in an example loading chamber mechanism.
Figure 2:
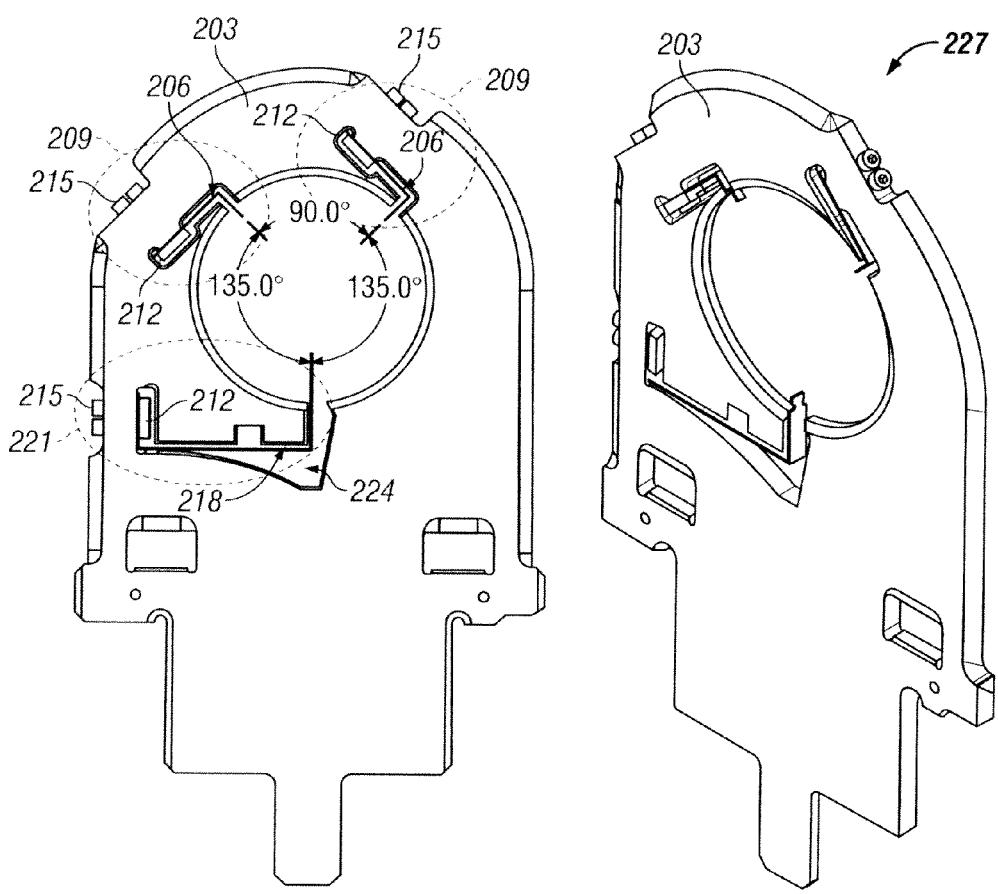
FIG. 2 (prior art) illustrates an example conventional disk substrate holder configured for 65 mm disk substrates.
Figure 3:
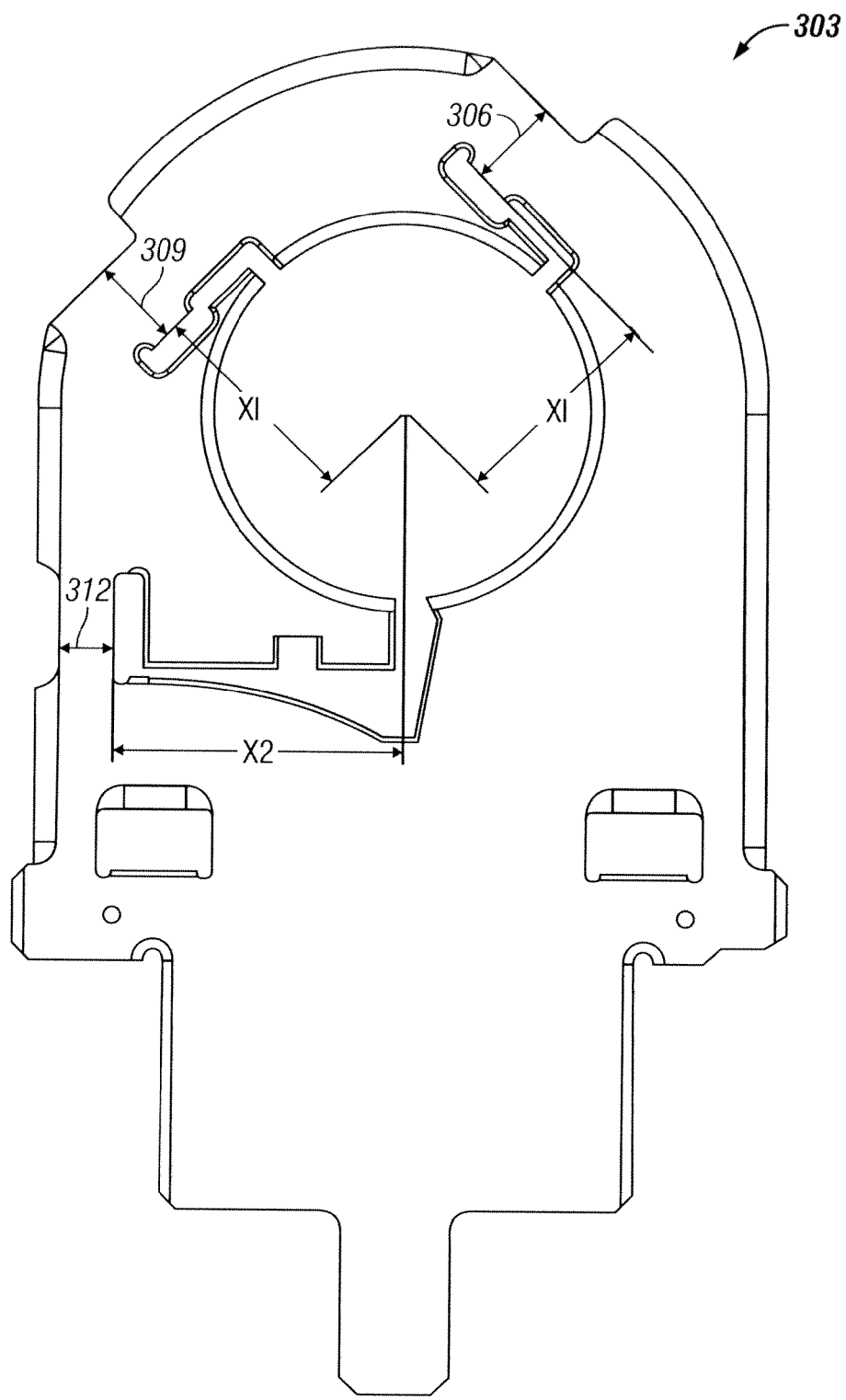
FIG. 3 (prior art) illustrates an example conventional disk substrate holder without gripper assemblies installed and before being subjected to a cleaning process.
Figure 4:
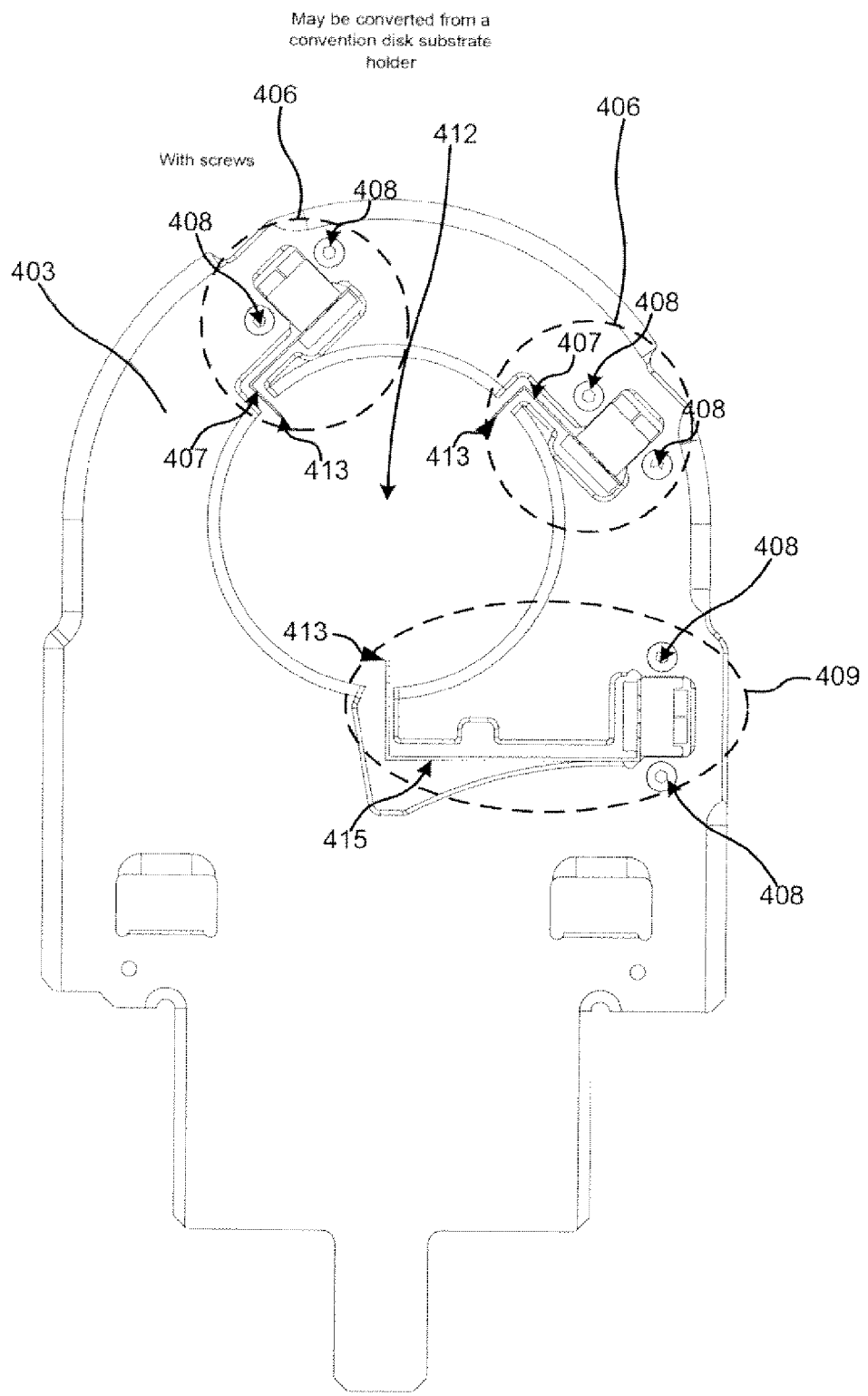
FIG. 4 illustrates an example disk substrate holder in accordance with an embodiment of the present invention.

FIG. 4 illustrates an example disk substrate holder 403 in accordance with an embodiment of the invention as described above. In some embodiments, disk substrate holder 403 may be configured to be used in conjunction with a loading chamber mechanism such as that illustrated in FIG. 1. As shown, disk substrate holder 403 comprises an opening designed to receive a disk substrate, removable top (406) and bottom (409) gripper assemblies to receive and hold the disk substrate within the opening.

The top gripper assemblies 406 are shown with (top) grippers 407, while the bottom gripper assembly 409 is shown with a (bottom) gripper 415. As illustrated, the top grippers 407 are configured with a shorter length than the bottom gripper 415. Additionally, the lengths of the grippers are configured such that their respective gripper tips 413 are positioned at predetermined, fixed distances relative to the center of the holder opening 412. By maintaining this fixed distance, the substrate holder 403 can ensure that the holder 403 maintains its hold on a disk substrate as the holder 403 is move chamber to chamber within the sputtering machine.

The opening 412 is configured to receive, hold, and release a disk substrate. In various embodiments, the bottom gripper 415 is configured to be sufficiently flexible to be forcibly bent and displaced from its static, un-sprung position, as shown in FIG. 4, to a displaced position (illustrated later in FIGS. 5 and 10), thereby allowing the disk substrate holder 403 to receive and hold or release a disk substrate through opening 412.

The illustrated gripper assemblies (406, 409) are attached to the substrate holder 403 using screws 408, thereby allowing the assemblies (406, 409) to remain separate from the holder 403 itself and, additionally, readily removable from the holder 403. For some embodiments, the removability allows the gripper assemblies (406, 409) to be removed during the substrate holder's 403 cleaning process. In other embodiments, the ability to easily remove the gripper assemblies (406, 409) from the holder 403 allows the assemblies to be easily replaced after the substrate holder 403. By replacing the gripper assemblies (406, 409) after a cleaning process with new gripper assemblies, the substrate holder 403 effectively maintains the grippers tips 413 predetermined, fixed distance relative to the center of the holder opening 412. As noted earlier, by maintaining the fixed distance of the gripper tips 413, the substrate holder 403 can ensure that the holder 403 maintains its hold on a disk substrate, and reduce the number of substrate drops that occur.

Although the gripper assemblies depicted (406, 409) are attached to the disk substrate holder 403 using screws 408, other embodiments may utilize alternative attachment mechanisms that ensure the gripper tips 413 maintain their fixed relative distance from the center of opening 412, while providing easy removability.

It should be noted and understood that disk substrate holder 403, and other embodiments of the invention, may be manufactured in accordance with the invention or, alternatively, created by converting a conventional disk substrate holder into an embodiment of the invention.

Figure 5:
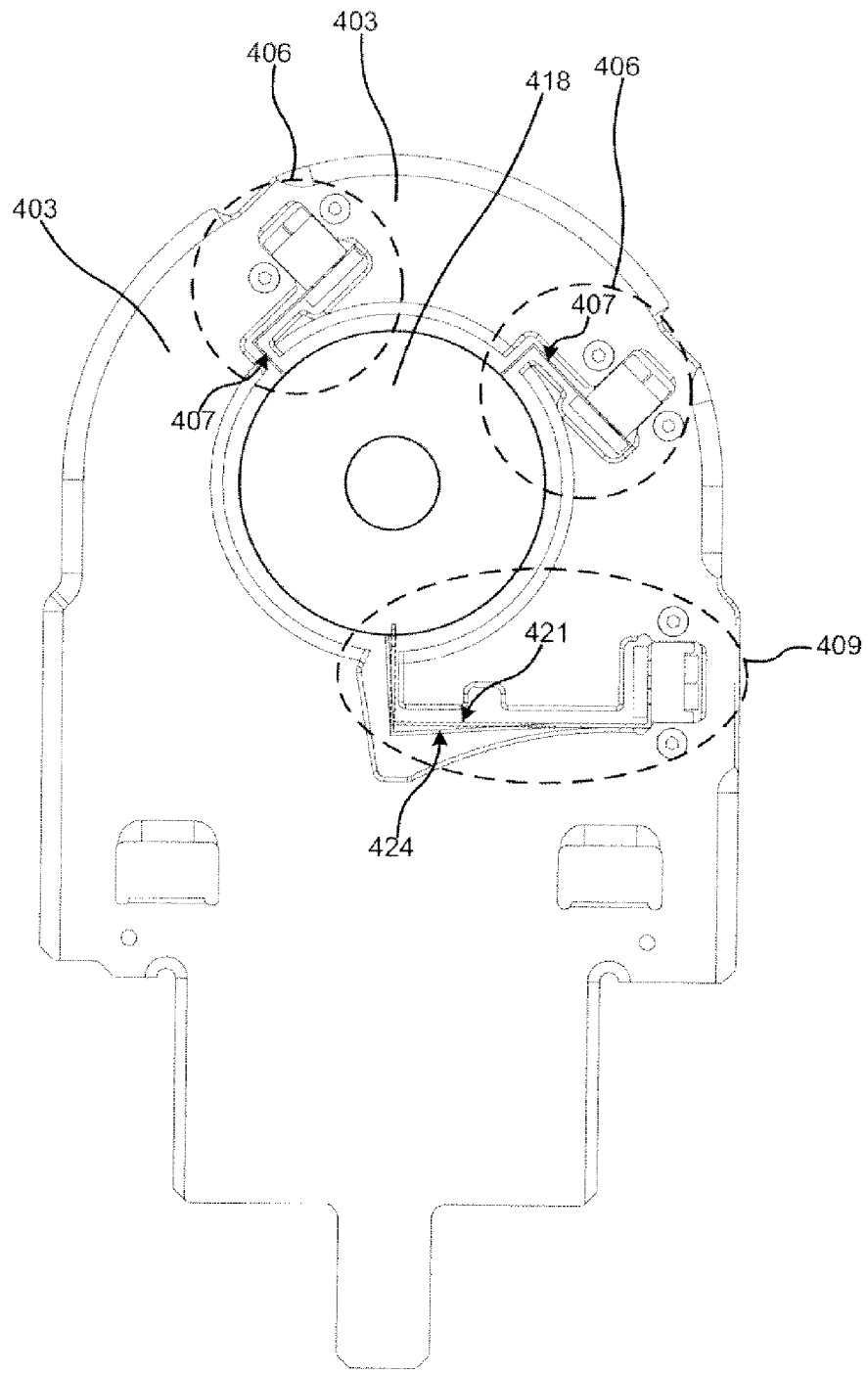
FIG. 5 illustrates an example disk substrate holder in accordance with an embodiment of the present invention holding a disk substrate.

Turning now to FIG. 5, the Figure illustrates an example disk substrate 418 placed within the opening 412, and held in place by top grippers 407, and bottom gripper 415. As described earlier, FIG. 5 shows bottom gripper 415 forcibly bent and displaced from its static, un-sprung position, portrayed by the ghost image 421. Due to the bottom gripper's 415 tendency to return to its static, un-sprung position (i.e., 421), the bottom gripper 415 exerts a force against the edge of the disk substrate 418, thereby causing the substrate 418 to remain in place. In particular embodiments, each of the grippers may comprise a tip configured to receive the edge of a disk substrate. For example, each of the grippers (407, 415) may be configured with a tip having a groove designed to receive and hold the edge of disk substrate 418. Other embodiments may have tips configured with alternative features that are also configured to receive and hold the edge of a disk substrate.

Figure 6:
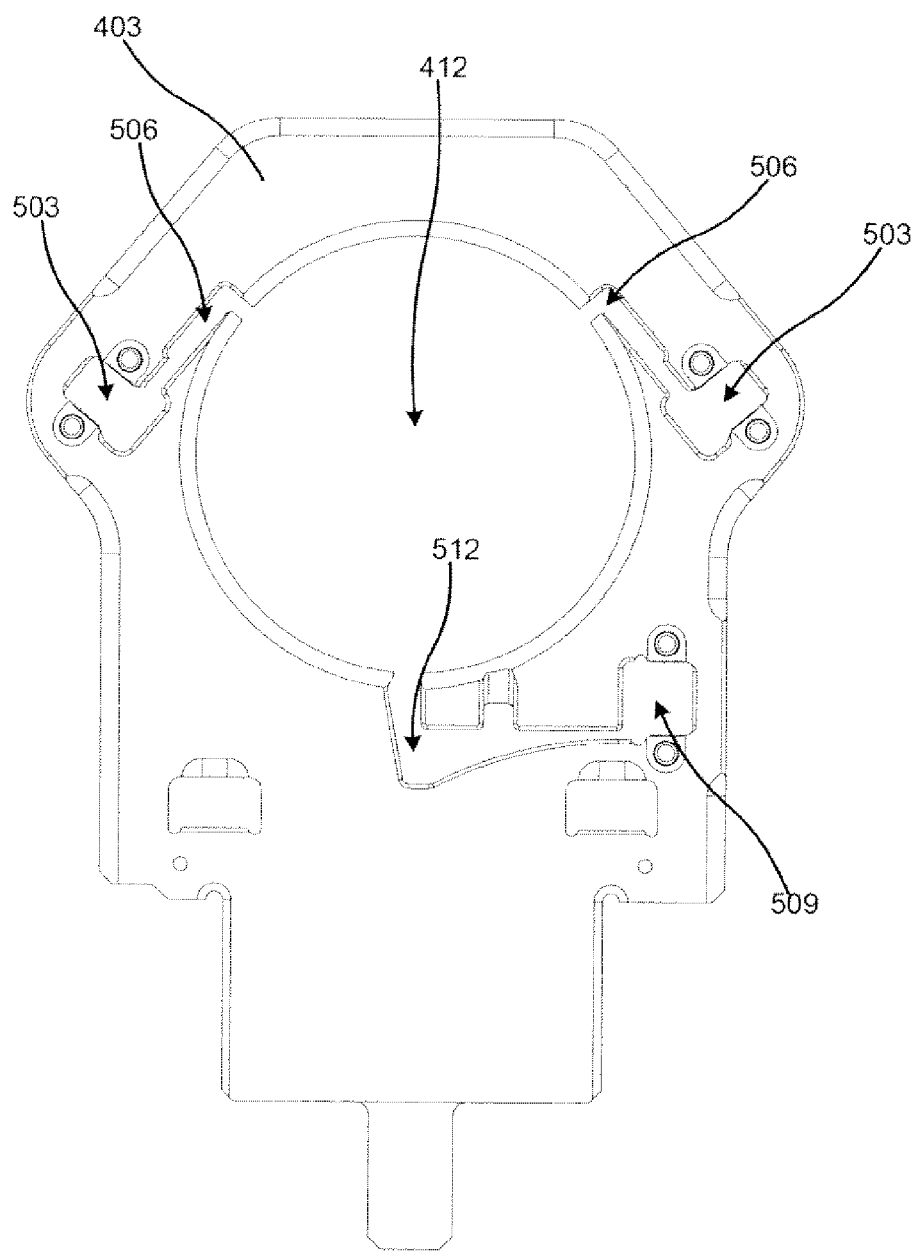
FIG. 6 illustrates the example disk substrate holder of FIG. 5 without the gripper assemblies installed.
Figure 7:
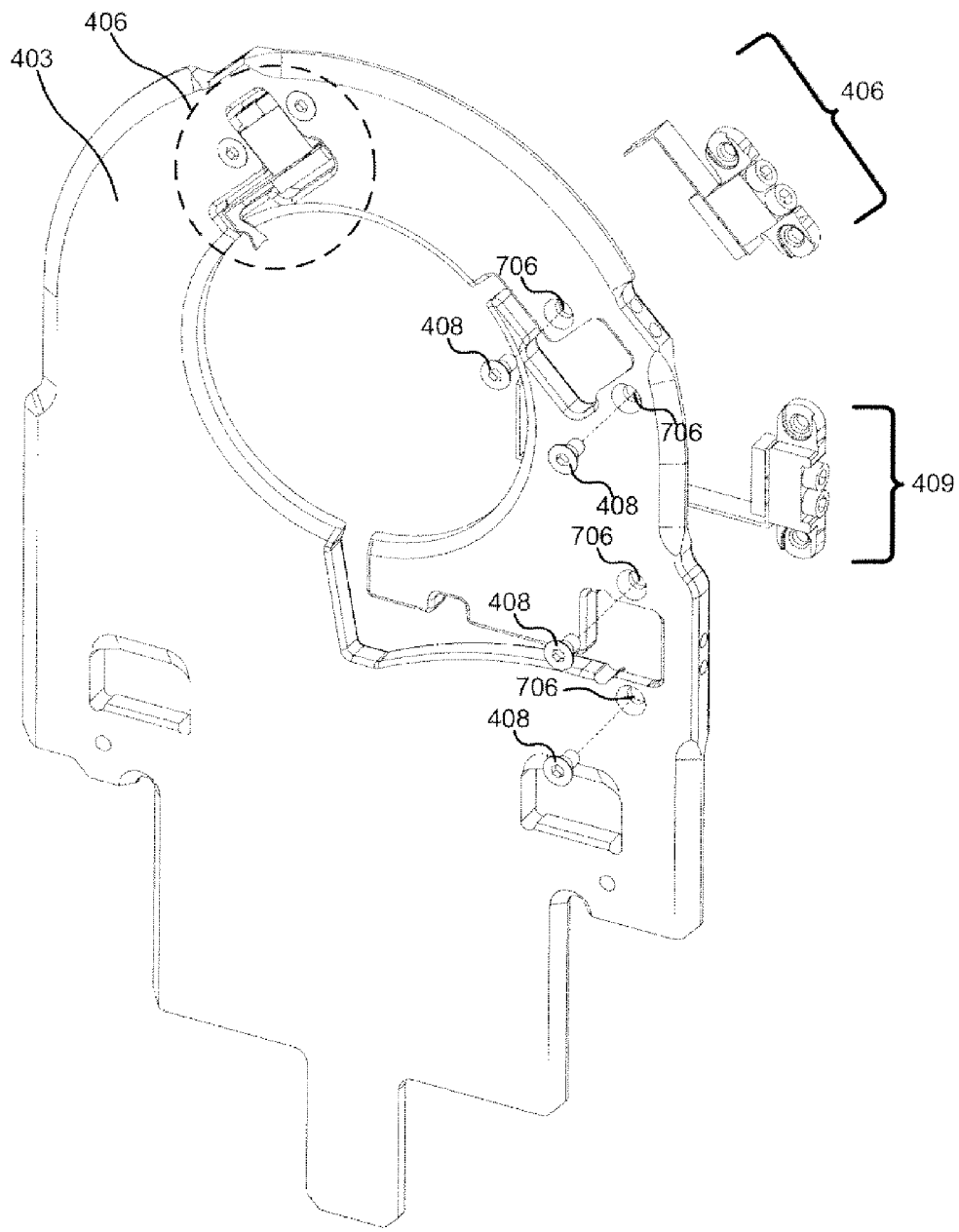
FIG. 7 illustrates the assembly of the example disk substrate holder of FIG. 5.

As discussed earlier, once the substrate holder 403 has been used for a period of days (e.g., 5 sputtering days), it accumulates enough sputtering during its use to be rendered it useless until a cleaning process has been performed on it. FIG. 6 illustrates the example disk substrate holder 403 with the gripper assemblies removed. Illustrated are openings 503 and 506 for mounting the top gripper assemblies 406 to the holder substrate 403, and openings 512 and 509 for the bottom gripper assembly. FIG. 7, on the other hand, illustrates how the top gripper assemblies 406, and the bottom gripper assembly 409 are mounted to the substrate holder 403 using screws 408, which secure the assemblies (406, 409) to the substrate holder 403 through holes 706.

Figure 8:
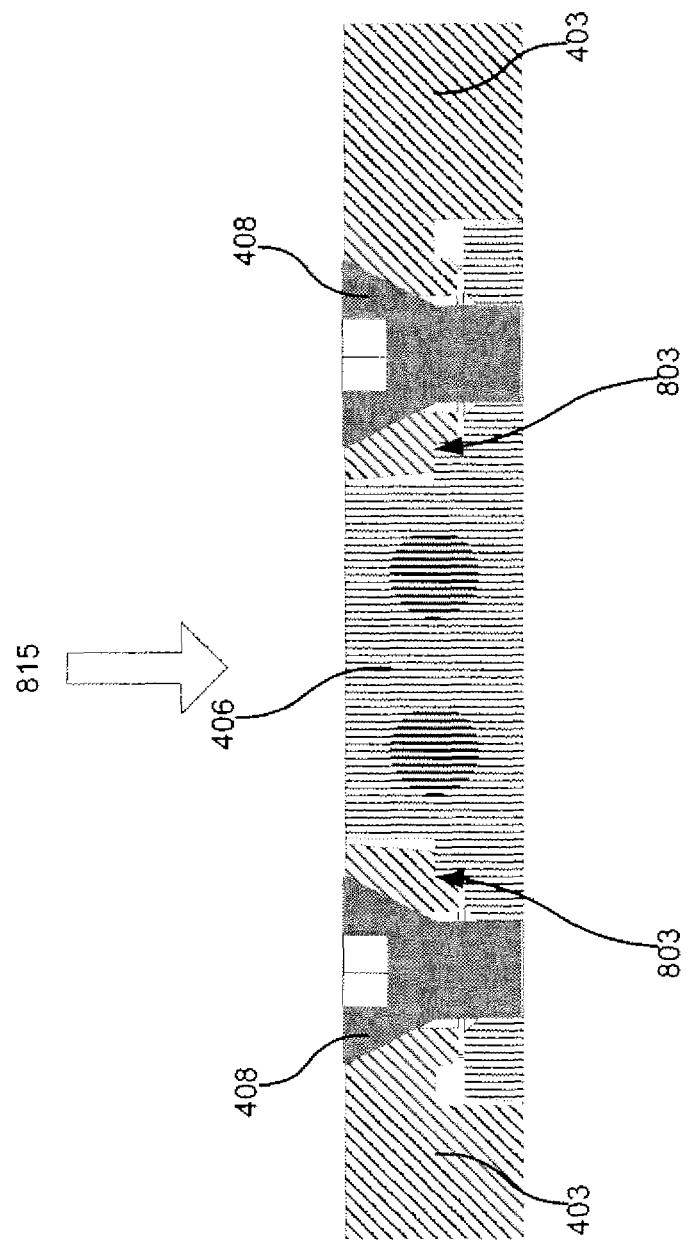
FIG. 8 illustrates a cross section view of the example disk substrate holder of FIG. 5 where a gripper assembly is installed.

In some embodiments, the gripper assemblies (406, 409), once mounted to mounted to the substrate holder 403, the assemblies (406, 409) are flush with substrate holder 403. This is illustrated in FIG. 8, which shows a cross-sectional view of a top gripper assembly 406 mounted to the substrate holder 403. As shown, the gripper assembly 406 is mounted to the holder 403 using screws 408, which secure the gripper assembly 406 within an opening of the holder 403 configured with features 803 (e.g., grooves) intended to align the assembly 406 with respect to the holder 403. When removing the gripper assembly 406 from the substrate holder 403, the screws 408 are loosened and removed, and the gripper assembly 406 is pushed out 815 from the substrate holder 403.

Figure 9A:
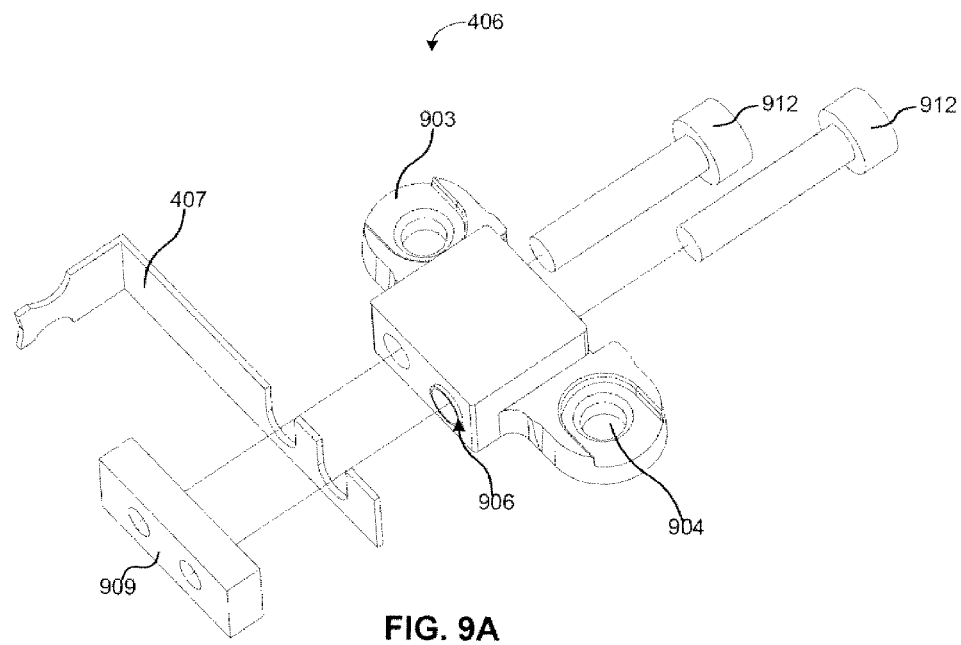
FIGS. 9A-9B illustrate a top gripper assembly in accordance with an embodiment of the present invention.
Figure 9B:
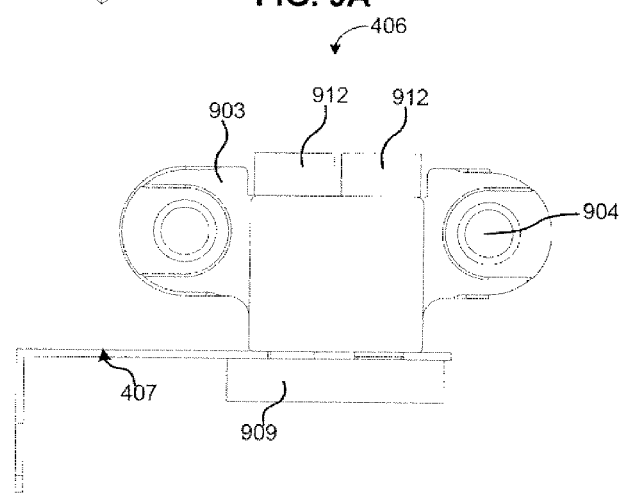

Referring now to FIG. 9A, a diagram is provided illustrating the construction of the top gripper assembly 406. As depicted, the top gripper assembly comprises the gripper 407, a mounting component 903, a nut bolt 909, and screws 912. The gripper 407 is attached to the mounting component 903 by placing the gripper 407 between the mounting component 903 and the nut bolt 909, and then securing the nut bolt 909 to the mounting component 903 using screws 912. The mounting component 903 comprises a dowel feature 906 used to align and secure orientation of the gripper 407 with respect to the mounting component 903. The mounting component 903 also comprises mounting holes 904, through which screws (e.g. 408) are passed to secure the gripper assembly 406 to a substrate holder 403. FIG. 9B illustrates how the top gripper assembly 406 appears once it is completely built.

Figure 10:
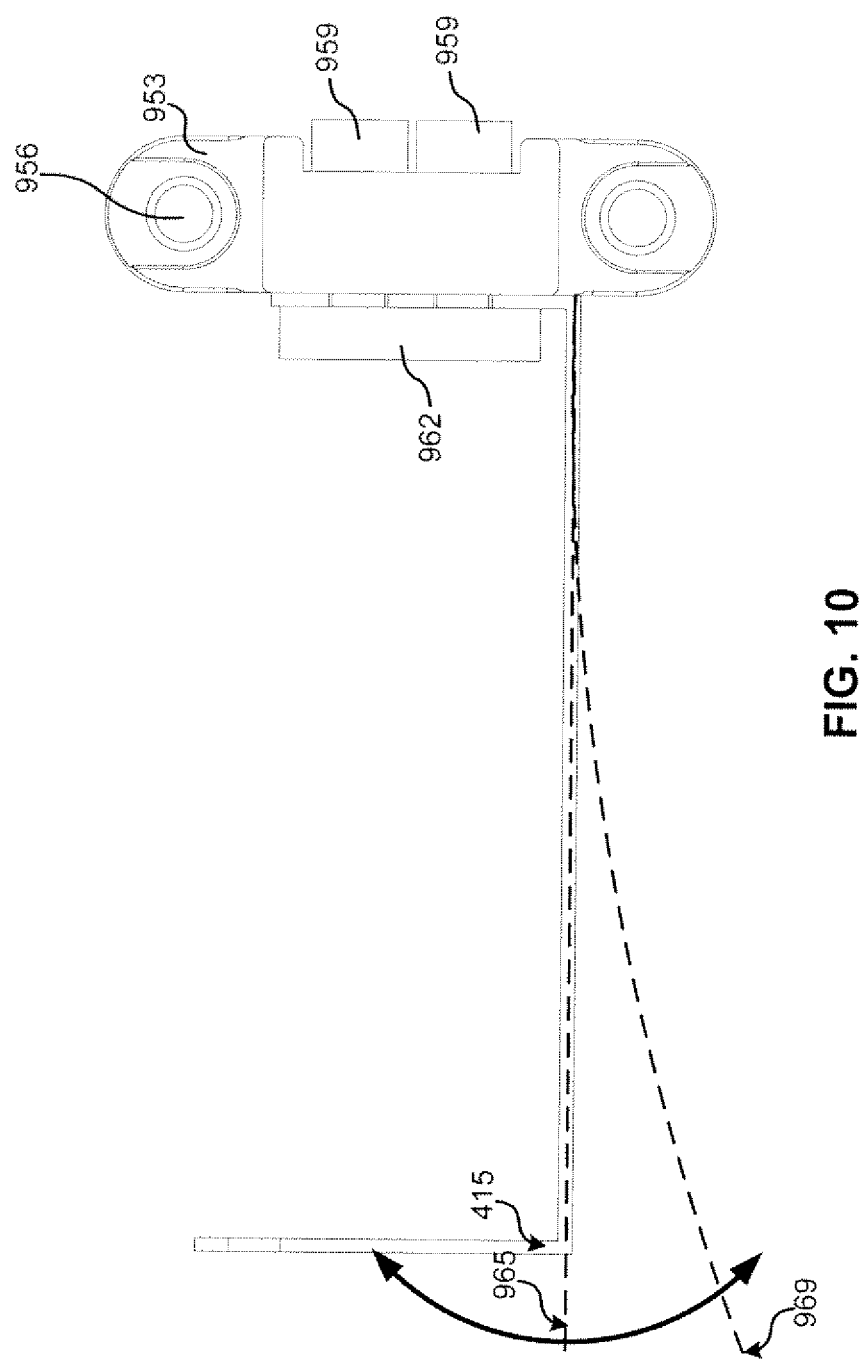
FIG. 10 illustrates a bottom gripper assembly in accordance with an embodiment of the present invention.

FIG. 10 is a diagram providing a detailed view of the bottom gripper 409. In comparison to the top gripper assembly 406 of FIGS. 9A-9B, the bottom gripper 409 shown comprises a lengthier gripper 415, configured to be sufficiently flexible to be forcibly bent and displaced from its static, un-sprung position 965, to a displaced position 969. As discussed before, by providing this flexibility, the bottom gripper assembly 409 allows the disk substrate holder 403 to receive and hold or release a disk substrate through opening 412. Similar to top gripper assembly 406, the bottom gripper assembly 409 is shown to comprise a gripper 415, a mounting component 953, a nut plate 962, and screws 959. Additionally, like top gripper assembly 406, the gripper 415 is attached to the mounting component 953 by placing the gripper 415 between the mounting component 953 and the nut bolt 962, and then securing the nut bolt 962 to the mounting component 953 using screws 959. Furthermore, like the top gripper assembly 406, the mounting component further comprises mounting holes 956, through which screws (e.g. 408) are passed to secure the gripper assembly 409 to a substrate holder 403. Although not shown, the mounting component 953 may also comprise a dowel feature disposed between the nut plate 962 and the mounting component 953, which assists in aligning the gripper 415 with respect to the mounting component 953.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A substrate holder apparatus, comprising:
a plate configured with an opening designed to receive a substrate;
a plurality of removable gripper assemblies disposed around the opening and configured to hold the substrate at a predetermined position within the opening such that the substrate is substantially coplanar with respect to a surface of the plate, at least one of the removable gripper assemblies comprising:
a support element configured to grip an outside edge of the substrate, the support element mounted to a mount assembly removably attached to the substrate holder apparatus such that the support element holds the substrate at the predetermined position with respect to the plate.

2. The substrate holder apparatus of claim 1, wherein at least one of the gripper assemblies is attached to a mounting position on a surface of the plate.

3. The substrate holder apparatus of claim 2, wherein the mounting position comprises a dowel feature configured to mate with a dowel opening of at least one of the gripper assemblies, the dowel opening configured to align that gripper assembly in a predetermined orientation with respect to the plate when the dowel feature is mated with the dowel opening.

4. The substrate holder apparatus of claim 1, wherein the mounting assembly of at least one of the gripper assemblies comprises a nut plate and a bracket, the nut plate attaching the support element to the bracket, and the bracket attaching that gripper assembly to the plate.

5. The substrate holder apparatus of claim 4, wherein the support element is disposed between the nut plate and the bracket.

6. The substrate holder apparatus of claim 5, wherein the bracket comprises a dowel feature disposed between the nut plate and the bracket, the dowel feature configured to align the support element with respect to the mounting assembly.

7. The substrate holder apparatus of claim 5, wherein the bracket of at least one of the gripper assemblies comprises a dowel opening configured to receive a dowel feature disposed on the plate and align that gripper assembly in a predetermined orientation with respect to the plate when the dowel feature is mated with the dowel opening.

8. The substrate holder apparatus of claim 1, wherein the support element of at least one of the gripper assemblies is L-shaped.

9. The substrate holder apparatus of claim 1, wherein the support element of at least one of the gripper assemblies comprises a NiCr-alloy.

10. The substrate holder apparatus of claim 1, wherein the support element of at least one of the gripper assemblies is a resilient element.

11. The substrate holder apparatus of claim 10, wherein the resilient element is configured to be movable such that the resilient element can grip or release the outside edge of the substrate.

12. The substrate holder apparatus of claim 1, wherein the opening is configured to receive a circular substrate.

13. The substrate holder apparatus of claim 1, wherein at least one of the removable gripper assemblies is removed during a cleaning process.

14. A removable gripper assembly for a substrate holder apparatus, comprising:
a support element configured to grip an outside edge of a substrate, the support element mounted to a mount assembly removably attached to the substrate holder apparatus such that the support element holds the substrate at a predetermined position with respect to the substrate holder apparatus.

15. The gripper assembly of claim 14, wherein the mounting assembly comprises a nut plate and a bracket, the nut plate attaching the support element to the bracket, and the bracket configured to attach the mounting assembly to the substrate holder apparatus.

16. The gripper assembly of claim 15, wherein the support element is disposed between the nut plate and the bracket.

17. The gripper assembly of claim 16, wherein the support element is disposed between the nut plate and the bracket.

18. The gripper assembly of claim 17, wherein the bracket comprises a dowel feature disposed between the nut plate and the bracket, the dowel feature configured to align the support element with respect to the mounting assembly.

19. The gripper assembly of claim 17, wherein the bracket comprises a dowel opening configured to receive a dowel feature disposed on the substrate holder apparatus and align the gripper assembly in a predetermined orientation with respect to the substrate holder apparatus when the dowel feature is mated with the dowel opening.

20. The gripper assembly of claim 14, wherein the support element is L-shaped.

21. The gripper assembly of claim 14, wherein the support element comprises a NiCr-alloy.

22. The gripper assembly of claim 14, wherein the support element of at least one of the gripper assemblies is a resilient element.

23. The gripper assembly of claim 22, wherein the resilient element is configured to be movable such that the resilient element capable of gripping and releasing the outside edge of the substrate.

24. The gripper assembly of claim 14, wherein the removable gripper assembly is removed during a cleaning process.

* * * * *